United States Patent
Haddad et al.

(10) Patent No.: US 8,934,419 B2
(45) Date of Patent: Jan. 13, 2015

(54) SYSTEM AND METHOD OF PROVIDING DENIAL OF SERVICE PROTECTION IN A TELECOMMUNICATION SYSTEM

(75) Inventors: Wassim Haddad, Boulder, CO (US); Mats Näslund, Bromma (SE); András Méhes, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1357 days.

(21) Appl. No.: 12/668,935

(22) PCT Filed: Jul. 13, 2007

(86) PCT No.: PCT/IB2007/001999
§ 371 (c)(1),
(2), (4) Date: Jun. 3, 2010

(87) PCT Pub. No.: WO2009/010814
PCT Pub. Date: Jan. 22, 2009

(65) Prior Publication Data
US 2010/0238874 A1 Sep. 23, 2010

(51) Int. Cl.
*H04W 4/00* (2009.01)
*H04L 29/06* (2006.01)
*H04W 60/00* (2009.01)
*H04W 80/04* (2009.01)

(52) U.S. Cl.
CPC ......... *H04L 63/1458* (2013.01); *H04W 60/005* (2013.01); *H04L 2463/141* (2013.01); *H04W 80/04* (2013.01)
USPC .......................................................... 370/329

(58) Field of Classification Search
CPC ....................... H04W 60/005; H04L 2463/141
USPC .......................................................... 370/329
See application file for complete search history.

(56) References Cited

U.S. PATENT DOCUMENTS

| | | | |
|---|---|---|---|
| 7,962,553 B2 * | 6/2011 | Kamalaksha | 709/205 |
| 2003/0018810 A1 * | 1/2003 | Karagiannis et al. | 709/238 |
| 2005/0226180 A1 * | 10/2005 | Devarapalli et al. | 370/328 |
| 2006/0010250 A1 * | 1/2006 | Eisl et al. | 709/245 |

(Continued)

OTHER PUBLICATIONS

Article, Mobile IP Enabling User Mobiliyty, Dec. 2006, http://ubiquity.acm.org/article.cfm?id=1217824, pp. 1-7.*

(Continued)

*Primary Examiner* — Derrick Ferris
*Assistant Examiner* — Faisal Choudhury
(74) *Attorney, Agent, or Firm* — Rothwell, Figg, Ernst & Manbeck, P.C.

(57) ABSTRACT

A system, method, and node for protecting a telecommunication system against a mobile and multi-homed attacker, MMA (10). The telecommunication system includes one or more correspondent nodes, CN, (102, 104) for transferring data packets. A mobile and multi-homed network node, MMN, (108) associated with the MMA communicates and receives data packets with the CN. An access router, AR, (106) transferring data between the MMN and the CN performs a reachability test with the MMN to determine if the MMN is still reachable. The AR sends a message to the CN to flush cached information associated with the MMN if the MMN is not reachable by the AR. The CN, upon receiving the message to flush cached information, flushes binding cache entries associated with the MMN from the CN.

16 Claims, 7 Drawing Sheets

(56) References Cited

U.S. PATENT DOCUMENTS

| | | | |
|---|---|---|---|
| 2006/0251044 A1* | 11/2006 | Haddad | 370/349 |
| 2007/0147304 A1* | 6/2007 | Jagana et al. | 370/331 |
| 2007/0160065 A1* | 7/2007 | Mundra et al. | 370/395.52 |
| 2007/0258424 A1* | 11/2007 | Wable et al. | 370/338 |
| 2007/0287472 A1* | 12/2007 | Haddad et al. | 455/456.1 |
| 2008/0240020 A1* | 10/2008 | Ye et al. | 370/328 |
| 2008/0253382 A1* | 10/2008 | Bachmann et al. | 370/400 |
| 2009/0129314 A1* | 5/2009 | Weniger et al. | 370/328 |
| 2009/0168698 A1* | 7/2009 | Weniger et al. | 370/328 |
| 2009/0232024 A1* | 9/2009 | Hori et al. | 370/254 |
| 2010/0046469 A1* | 2/2010 | Kang et al. | 370/331 |
| 2010/0226256 A1* | 9/2010 | Kato et al. | 370/241 |
| 2010/0226310 A1* | 9/2010 | Kuparinen et al. | 370/328 |
| 2010/0238864 A1* | 9/2010 | Hirano et al. | 370/328 |
| 2010/0296481 A1* | 11/2010 | Weniger et al. | 370/331 |
| 2011/0090842 A1* | 4/2011 | Hirano et al. | 370/328 |
| 2011/0261804 A1* | 10/2011 | Antoine et al. | 370/342 |
| 2012/0297186 A1* | 11/2012 | Weniger et al. | 713/155 |

OTHER PUBLICATIONS

Aura, T. et al., "Effects of Mobility and Multihoming on Transport-Protocol Security", Security and Privacy, 2004, Proceedings, 2004 IEEE Symposium on Berkeley, CA, USA May 9-12, 2004, Los Alamitos, CA, USA, IEEE Comput. Soc., US, May 9, 2004, pp. 12-26, XP010768034.

Nikander, P., et al., "Integrating Security, Mobility, and Multi-homing in a HIP Way", Proceedings Internet Society Symposium on Network and Distributed System Security, Jan. 1, 2003, pp. 1-13, XP002417194.

Nikander, P., et al., Ericsson Research Nomadic Lab, Aura, T., Microsoft Research, Montenegro, G., Microsoft Corporation, Nordmark, E., Sun Microsystems, "Mobile IP Version 6 Route Optimization Security Design Background; draft-ietf-kip6-ro-sec-03.txt" IETF Standard-Working-Draft, Internet Engineering Task Force, IETF, CH, vol. mip6, No. 3, Jun. 1, 2005, 41 pages, XP015041015.

* cited by examiner

SYSTEM AND METHOD OF PROVIDING DENIAL OF SERVICE PROTECTION IN A TELECOMMUNICATION SYSTEM

CROSS REFERENCE TO RELATED APPLICATION

This application is a 35 U.S.C. §371 National Phase Application from PCT/IB2007/001999, filed Jul. 13, 2007, and designating the United States.

TECHNICAL FIELD OF THE INVENTION

The present invention relates generally to communication networks, and in particular, to communication networks that employ denial of service protection.

DESCRIPTION OF RELATED ART

A mobile node (MN) is a device which can move and thereby change its attachment point to a network, typically meaning that it can change its network (IP) address over time. A multihomed node is a device which can simultaneously have several network attachment points, thereby simultaneously having several IP addresses. A mobile and multi-homed network node (MMN) is consequently a node which can simultaneously have many addresses and any or all of these addresses can change over time. A mobile and multi-homed attacker (MMA) is a malicious party who controls one (or more) MMNs. The MMA can be the user of the MMN or someone (or some other entity) who has planted a "virus" or some other functionality in the MMN and may thus not be "physically" connected to the MMN.

It is possible for an MMA to use a MMN to launch a network flooding attack against any network to which the MMA is able to attach the MMN. This MMN attach may be conducted by using a mobile Internet Protocol version 6 (MIPv6) protocol. The flooding attack from the MMN is made possible by moving to a context in which the MMA is simultaneously controlling different interfaces connected to different networks. In such a multi-homing context, the MMA is able to exploit the mobility signaling messages in order to combine any two or more interfaces and present them to the corresponding node(s) as being each either a home or foreign network.

To combat such an MMA, ingress filtering may be utilized, which is common in networks such as 3GPP networks. However, although the ingress filtering may provide a capability to identify an attacker, ingress filtering may not prevent the attack. In addition, in a non-3GPP environment, the problem is far more serious because the telecommunication system has less control due to being a more open and "public" environment. For instance, not all attached MNs may be properly authenticated if outside a 3GPP environment. Also, as will be described, ingress filtering may not always be effective.

Figure 1:
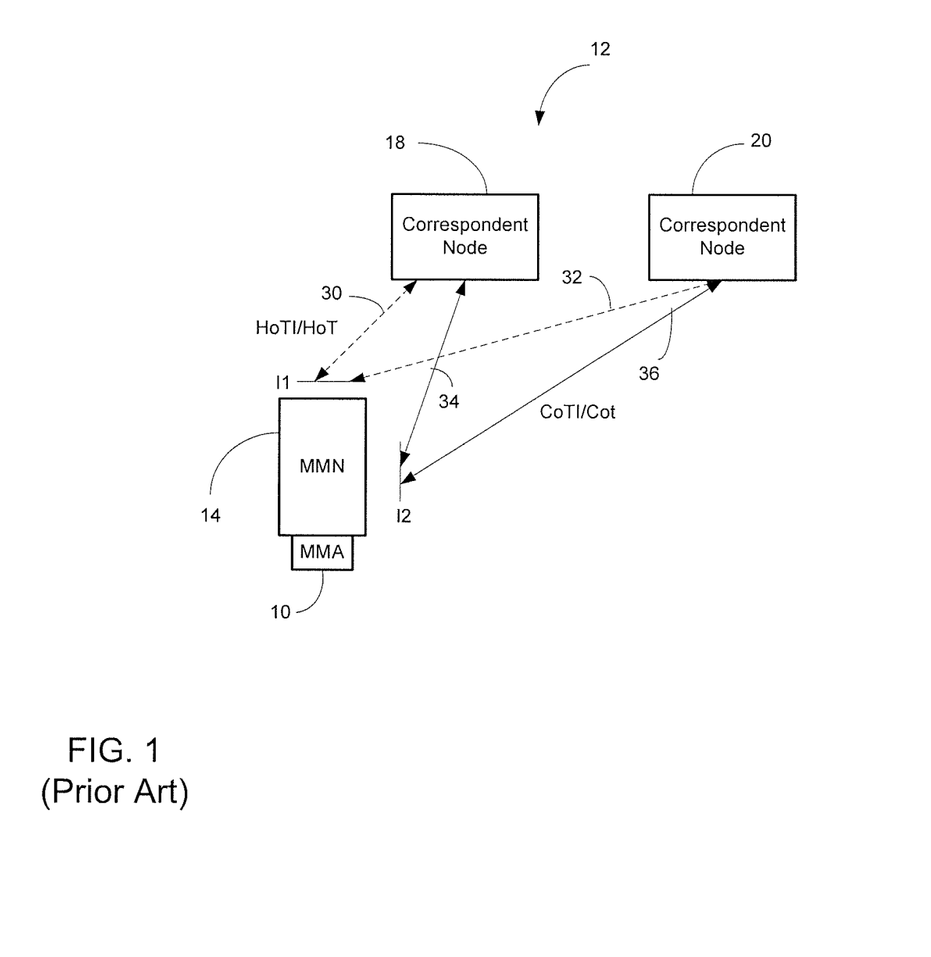
FIG. 1 (prior art) is a simplified block diagram illustrating a return routability (RR) procedure executed in a conventional flooding attack from a MMN in a telecommunication system.

FIG. 1 is a simplified block diagram illustrating a return routability (RR) procedure executed in a conventional flooding attack from a MMA controlling a MMN 14 in a telecommunication system 12. The telecommunication system includes a mobile and multi-homed network node (MMN) 14. The MMN 14 includes a first interface $I_1$ and a second interface $I_2$. The interfaces may be associated with IP addresses. The telecommunication system also includes correspondent nodes (CN) 18 and 20.

To launch the network flooding attack, the MMA must attach one of the MMN's interfaces (for example, $I_1$) to its corresponding home or foreign network and attach the other interface ($I_2$) to a targeted node (for example, CN 18 or 20).

To commence the flooding attack, the MMA utilizes the interface $I_1$ of the MMN to establish different sessions with different CNs. After establishing these different sessions with different CNs, the MMA switches the MMN to a route optimization (RO) mode by triggering a return routability (RR) procedure. The RR procedure requires a home address (HoA) reachability test, which involves exchanging HoTI/HoT messages 30 and 32 with each CN 18 and 20 and a care-of address (CoA) reachability test, exchanging CoTI/CoT messages 34 and 36 with the CNs. For this purpose, the HoA reachability test is performed by using the MMN's IPv6 address configured on $I_1$ as the HoA. In addition, the CoA reachability test is conducted by using the IPv6 address configured on $I_2$ as the CoA.

Figure 2:
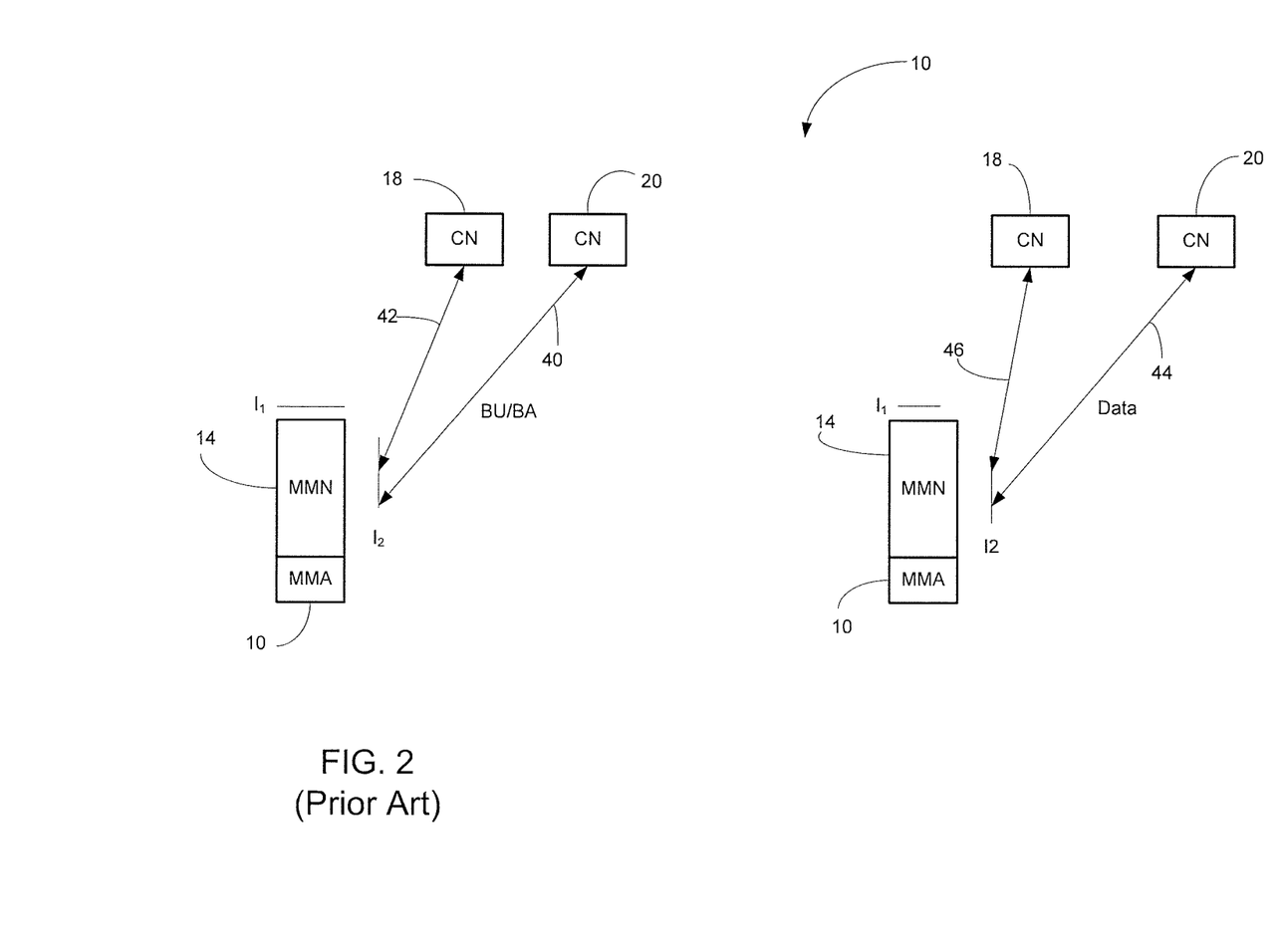
FIG. 2 (prior art) is a simplified block diagram illustrating a binding updates exchange process during the conventional flooding attack from the MMN in the telecommunication system.

FIG. 2 is a simplified block diagram illustrating a binding updates exchange process during the conventional flooding attack launched from the MMN 14 in the telecommunication system 12. After completing all RR procedures, the MMN is made to send a binding update (BU) message to each CN 18 and 20 on the interface $I_2$ in order to request the creation of a binding between the two addresses and the re-routing of data packets towards the targeted network. In Optimized Mobile IPv6 (OMIPv6), the first exchange of BU and binding acknowledgment (BA) messages 40 and 42 enables the MMN to share a long lifetime secret with the CN. In addition, data messages 44 and 46 are sent between the CNs and the MMN.

Figure 3:
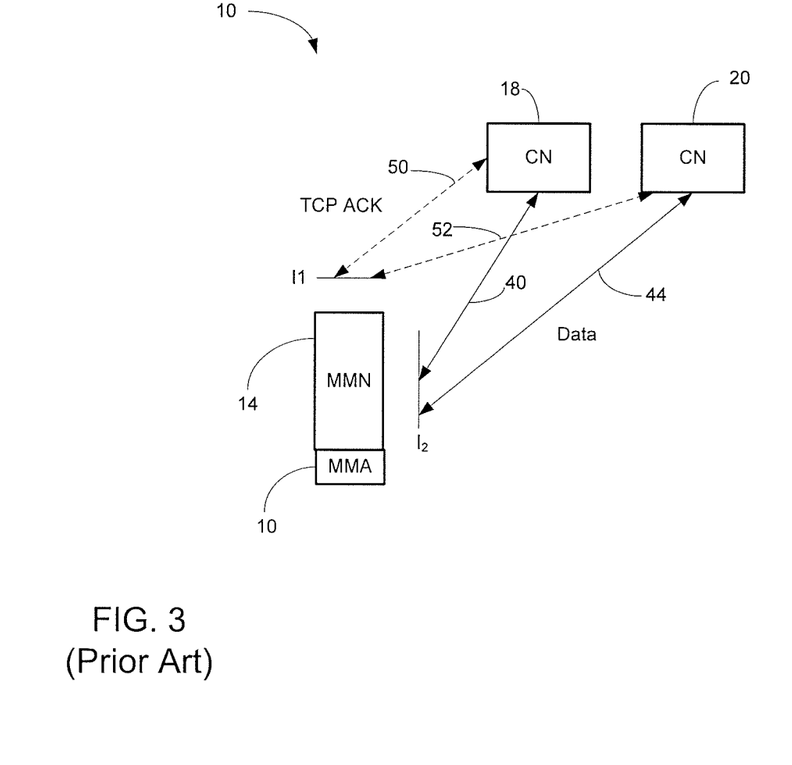
FIG. 3 (prior art) is a simplified block diagram illustrating data packets flooding the targeted network in the conventional flooding attack from the MMN in the telecommunication system.

FIG. 3 is a simplified block diagram illustrating data packets flooding the targeted network in the conventional flooding attack in the telecommunication system 12. The attack starts when the MMA 10 switches off the interface $I_2$ whereby the MMN disappears from the targeted network. At the same time, the MMN 14 is made to continue to send acknowledgment (ACK) messages 50 and 52 to each CN on the interface $I_1$ in order to flood the targeted network as long as needed. The MMA may re-attach the MMN interface $I_2$ to the targeted network at any time, autoconfigure a new IP address, and use the new IP address to send a new BU message to the CNs 18 and 20 before disappearing again.

The attack described above is immune against ingress filtering, especially when each interface is using its own legitimate IP address and is sending only the appropriate signaling message. Primarily, the main characteristic of the attack is that the MMN 14 associated with the MMA exploits the entire pool of available addresses (i.e., HoA and CoA) configured on the interfaces. In an extension to the network flooding attack, several interfaces are utilized as each being a different home network and the interfaces are used to send ACK messages to CNs.

There is no existing system or method to combat a flooding attack from a MMN. In a 3GPP setting, ingress filtering may be assumed to be in place. However, the ingress filtering cannot prevent the attack. In a 3GPP setting, it may be possible to identify and track an attacker after the attack due to the use of strong authentication. However, in the 3GPP setting, the flooding attack cannot be prevented. The signaling pattern exploited by the MMA is completely legitimate and cannot be detected as being used to launch a malicious attack. In the case of a telecommunication system utilizing a non-3GPP setting, it is even far more susceptible to the attack from the MMA.

Accordingly, there is a need for a system and method of protecting a telecommunication system against attacks by MMAs. The present invention provides such a system and method.

SUMMARY OF THE INVENTION

The present invention is a system and method of protecting a telecommunication system against a flooding attack from a multi-homed network node, in particular, a mobile and multi-homed network node (MMN). The attacker (MMA) alternatively can be the user of the MMN or someone (or some other entity) who has planted a "virus" or some other functionality in the MMN and may thus not be "physically" connected to the MMN. The present invention provides both protection and deterrence against a detected denial of service (DoS) flooding attack.

In one embodiment, it is assumed that the MMA is in control of one single MMN and thus the terms MMN/MMA may be utilized interchangeably since the actions of the MMA are carried out by the MMA controlling the MMN to perform certain protocol actions. Of course, the case when the MMA controls several MMNs is more serious, but distributed denial of service (DDoS) attacks can be handled one-by-one (or in parallel) applying the same method as disclosed below to each controlled MMN.

Thus in one aspect, the present invention is directed to a system for protecting a telecommunication network against a flooding attack from a multihomed network node, the telecommunication network providing communications to a network node working as a correspondent node (CN) for the multihomed network node. The system includes means for determining whether the multihomed network node remains reachable a predetermined time after the CN and the multihomed network node begin to transfer data packets therebetween; and means responsive to a determination that the multihomed network node is no longer reachable, for flushing from the CN, cached information associated with the multihomed network node. The multihomed network node may be a mobile multihomed network node (MMN) having a plurality of IP addresses. The means for determining whether the multihomed network node remains reachable may be an access router (AR) associated with the CN, which performs a reachability test with the MMN. If the multihomed network node is no longer reachable, the AR sends a message to the CN instructing the CN to flush the cached information associated with the multihomed network node. When the cache has been flushed, data transmission towards the network under attack is effectively stopped.

In another aspect, the present invention is directed to a method of protecting a telecommunication network against a flooding attack from a multihomed network node, the telecommunication network providing communications to a network node working as a correspondent node (CN) for the multihomed network node. The method includes the steps of transferring data between the CN and the multihomed network node; and determining whether the multihomed network node remains reachable. If the multihomed network node remains reachable, the method continues to transfer data between the CN and the multihomed network node. If the multihomed network node is no longer reachable, the method flushes from the CN, cached information associated with the multihomed network node. The multihomed network node may be a mobile multihomed network node (MMN) having a plurality of IP addresses.

In still another aspect, the present invention is directed to a network protection node for protecting a telecommunication network against a flooding attack from a multihomed network node, the telecommunication network providing communications to a network node working as a correspondent node (CN) for the multihomed network node. The protection node includes means for determining whether the multihomed network node remains reachable a predetermined time after the CN and the multihomed network node begin to transfer data packets therebetween; and communication means, responsive to a determination that the multihomed network node is no longer reachable, for sending a message to the CN instructing the CN to flush cached information associated with the multihomed network node. In a preferred embodiment, the network protection node is an access router.

BRIEF DESCRIPTION OF THE DRAWINGS

In the following section, the invention will be described with reference to exemplary embodiments illustrated in the figures, in which.

DETAILED DESCRIPTION OF EMBODIMENTS

Figure 4:
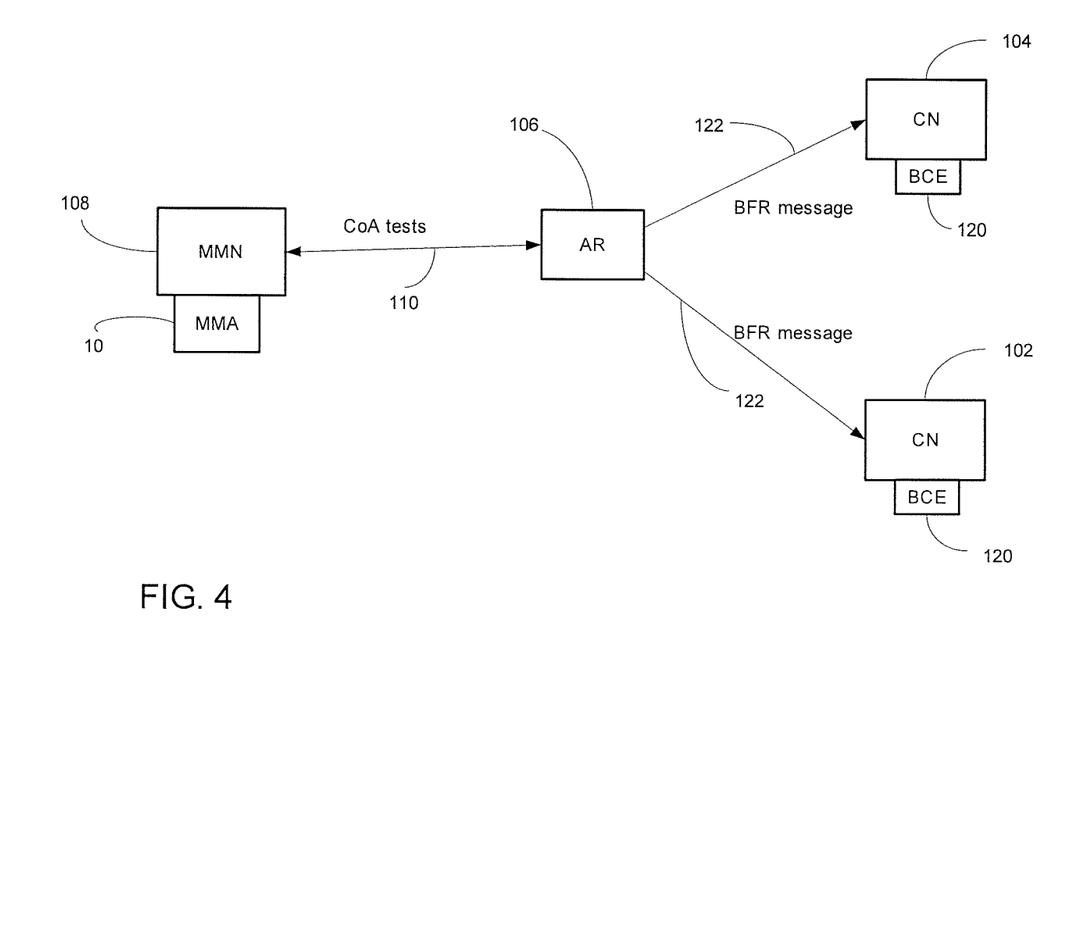
FIG. 4 is a simplified block diagram of components of a telecommunication system employing DoS protection in an exemplary embodiment of the present invention.

FIG. 4 is a simplified block diagram of components of a telecommunication system 100 employing DoS protection in an exemplary embodiment of the present invention. The present invention provides protection against denial of service (DoS) attacks within a telecommunication system 100. The system includes a CN 102, a CN 104, and an access router (AR) 106. As in the conventional scenarios, the MMN 108 attempts to attack a target network through the CNs.

The present invention actively involves the foreign network in keeping the MIPv6 route optimization mode (RO) running between the two endpoints of the network. In one embodiment of the present invention, three provisions for defending against these attacks are utilized. The first provision is to delegate the MMN CoA reachability tests to the MMN's access router (AR). The second provision is to introduce a new signaling message, which tells the CNs to flush cached information within the CNs, which would otherwise be used to maintain data-flow to the targeted network, thereby stopping the flooding. The third provision is to make the MMAs aware that the above two steps are implemented in the network. This provides deterrence against attacks by MMNs by making them aware that the countermeasures are in place.

In the first provision, the CoA reachability tests 110 are performed between the MMN 108 and the AR 106, which replace the CoTI/CoT messages of FIG. 1 with a prefix reachability test.

In the second provision of the present invention, the main purpose is to increase the foreign network's ability to protect against the flooding attack described in FIGS. 1-3. To facilitate this purpose, the trust between the MMN and its AR, which is obtained by running the OptiSEND protocol, is exploited to also build a trust relationship between the AR and the CN(s) and is also strongly associated with the MMN. It should be understood that the MMN may be the attacker. Thus, the purpose is not to create a "transitive" trust from the MMN to the CN, but rather the opposite. Thus, if the MMN is indeed an attacker, the main trust exploited is between the AR 108 and CNs 102 and 104. This trust can be associated with a particular MMN 108.

The trust relationship between the CN and the AR enables the AR 106 to explicitly and securely request the CN to flush out from its binding cache entries (BCEs) 120 any CoA which has been used to launch a flooding attack against the network. For this purpose, the AR preferably sends to the CN(s) a new mobility signaling message called a "binding flush request" (BFR) message 112 which contains the MMN's HoA. If the AR 106 has properly authenticated the MMN 108 and the AR is trusted, a discovered attack can be tied to the MMN and, in general, the CNs may tie a flush message to the particular MMN involved in the attack.

Upon receiving a valid BFR message 112, the CNs delete the MMN's corresponding entry from their BCEs 120 and close all ongoing sessions with the MMN 108. In addition, each CN preferably replies to the AR 106 by sending a binding flush acknowledgment (BFA) message 122. The BFA message is preferably also authenticated with a key used by the AR.

The third provision of the present invention is to make the MMN 108 controlled by an MMA fully aware of the protection measures (i.e., the first two provisions) being employed in the telecommunication system 10. Alerting the MMA about the foreign network rules is preferably provided by adding an extension to the OptiSEND protocol, which explicitly requests the MMN to share with the AR, the hash of its long lifetime shared secret (Ks) obtained from running OMIPv6 protocol. The extension in the OptiSEND protocol may include setting one new bit in the router advertisement (RtAdv) message sent periodically by the AR. The SEND protocol may also be utilized to alert the MMA that protection measures are being employed in the telecommunication system.

The new shared key, called Kc, enables the AR 106 and the CNs to authenticate the prefix reachability test messages (i.e., implicitly test Kc validity) and to authenticate the BFR and BFA messages as discussed above.

Figure 5:
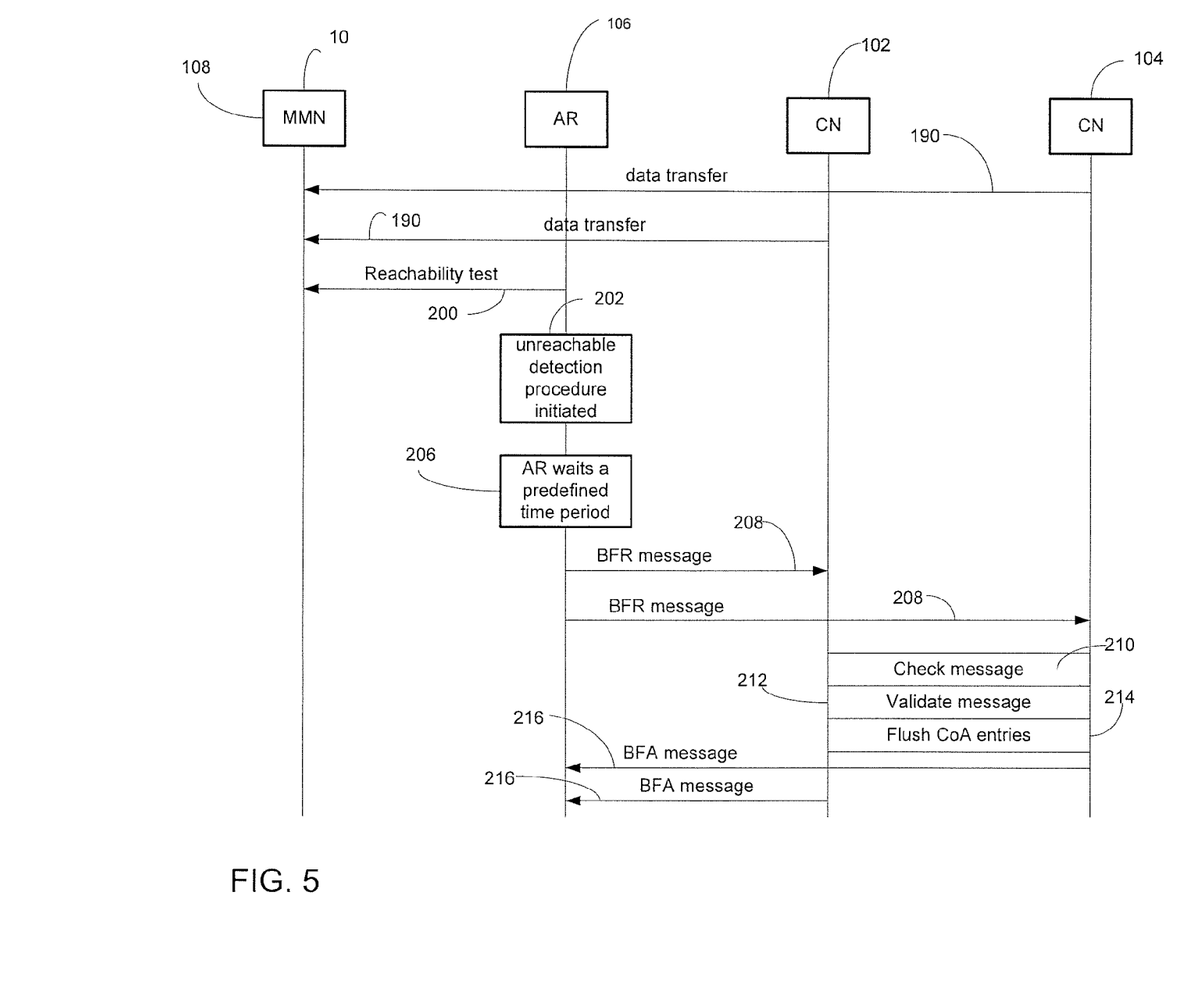
FIG. 5 is a signaling diagram illustrating the flow of messages when defending against an attack from the MMN in the exemplary embodiment of the present invention.

FIG. 5 is a signaling diagram for defending against an attack from a MMA in the exemplary embodiment of the present invention. Data is transferred between the CN 102 and 104 and the MMA's MMN 108 at 190. During the time period when the CN is transferring packets, a reachability test 110 is conducted at 200 between the AR 106 and the MMN 108. At 202, the AR triggers an unreachability detection procedure. It should be noted that the MMN has switched off its interface prior to flooding the network, which triggers the unreachability detection by the AR. The unreachability detection procedure shows the AR that the MMN is unreachable on the link. The AR 106 then waits for a predefined time period at 206. Upon expiration of the predefined time period, the AR sends a BFR message 112 to each CN's address stored in its cache at 208. Preferably, all BFR messages are authenticated with Kc. During the waiting time period, the AR may store the received data packets in its cache memory since the MMN may just be out of reach because of other possible factors (for example, noise on the link, and the like).

Upon receiving the BFR message 208, the CNs 102 and/or 104 determine whether the CoA carried in the message is already stored in the CN's BCE 120 at 210. The CN then retrieves the corresponding Kc and validates the authentication at 212. At 214, the CN flushes out the CoA corresponding entry and closes the session. At the end of this step, the flooding attack is halted. In addition, all CNs have deleted the attacker's entries from their BCEs. The CN may provide a specified policy to accept a new connection request from a node having the same HoA. After flushing out the MMN's corresponding entry, each CN preferably sends a BFA message 122 to the AR 106 at 216. The BFA message may be authenticated with Kc.

Figure 6A:
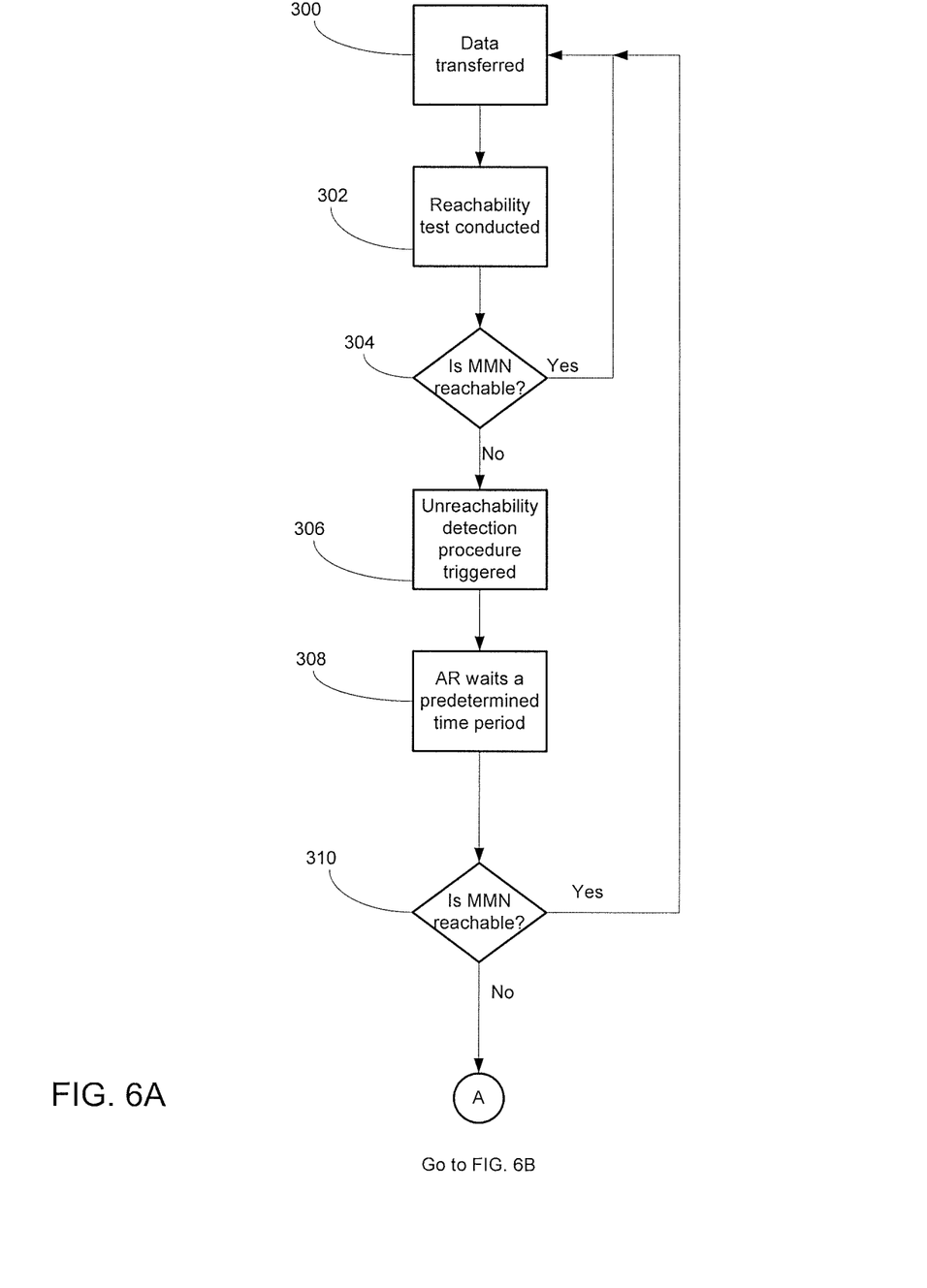
FIGS. 6A-6B are portions of a flow chart illustrating the steps of an exemplary embodiment of the method of the present invention when defending against an attack from the MMN.
Figure 6B:
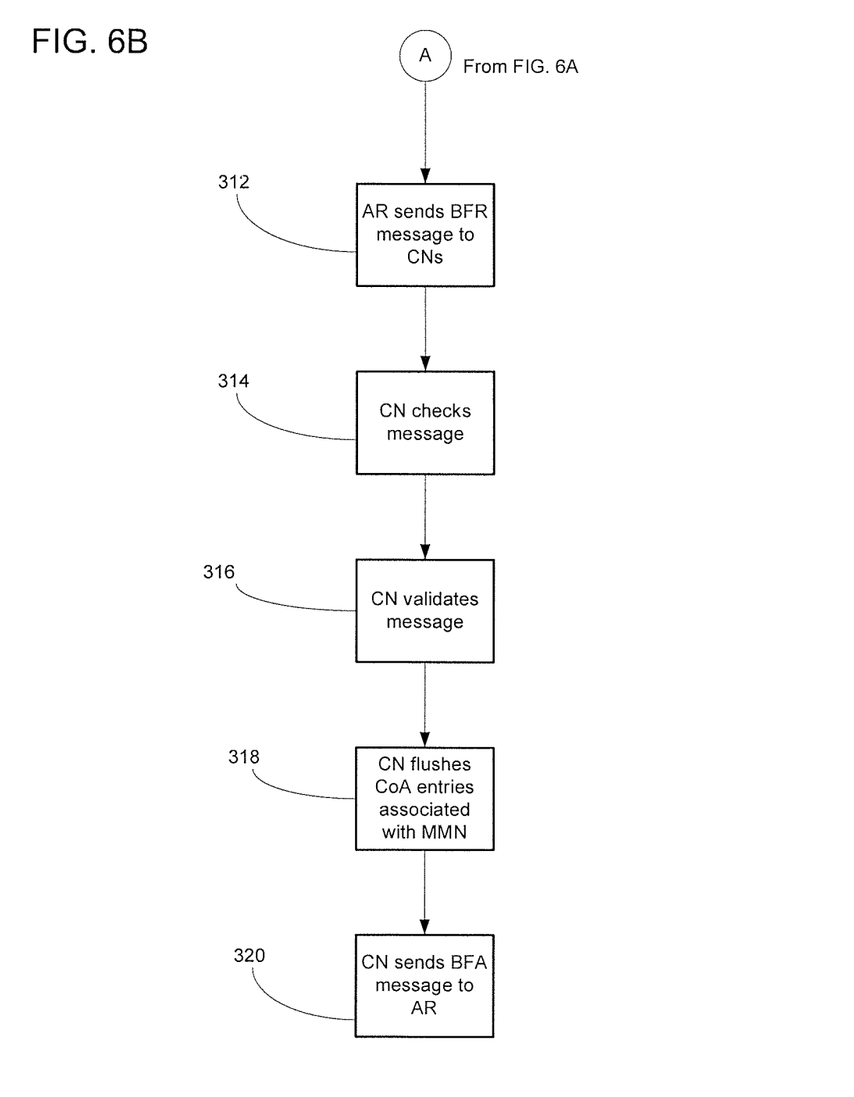

FIGS. 6A-6B are portions of a flow chart illustrating the steps of an exemplary embodiment of the method of the present invention when defending against an attack from the MMN. With reference to FIGS. 4, 5, 6A and 6B, the method will now be explained. The method begins at step 300 where data is transferred between the CN 102 and 104 and the MMN 108 (and MMA 110). Next, in step 302, a reachability test 110 is conducted between the AR 106 and the MMN 108. The method then moves to step 304 where it is determined that the MMN is not reachable (i.e., the AR cannot perform a CoA reachability test 110 with the MMN). If it is determined that the MMN is reachable, the method returns to step 300 where data continues to be transferred to the MMN from the CN.

However, in step 304, if it is determined that the MMN is not reachable, the method then moves to step 306 where the AR triggers an unreachability detection procedure. During the attack, the MMN has switched off its interface prior to flooding the network, which triggers the unreachability detection by the AR. The unreachability detection procedure shows the AR that the MMN is unreachable on the link. During the waiting time period, the AR may store the received data packets in its cache memory as the MMN may just be out of reach because of other possible factors (for example, noise on the link and the like). Next in step 308, the AR 106 waits for a predefined time period. At the end of the predefined time period, the method moves to step 310, where it is again determined if the MMN is reachable. If the MMN is determined to be reachable (i.e., successful reachability tests 110), the method returns to step 300 where data continues to be transferred. However, in step 310, if the MMN is still unreachable, the method moves to FIG. 6B, step 312 where the AR sends a BFR message 112 to each CN's address stored in its cache. Preferably, all BFR messages are authenticated with Kc.

Next, in step 314, upon receiving a BFR message 122, the CNs 102 and/or 104 determine whether the CoA carried in the message is already stored in the CN's BCE 120. The method then moves to step 316 where the CN then retrieves the corresponding Kc and validates the authentication. Next, in step 318, the CN flushes out the CoA corresponding entry and closes the session. At the end of this step, the flooding attack is halted. In addition, all CNs delete the attacker's entries from their BCEs. The CN may provide a specified policy to accept a new connection request from a node having the same HoA. The method moves to step 320, where, after flushing out the MMN's corresponding entry, each CN preferably sends a BFA message 216 to the AR 106. The BFA message may be authenticated with Kc.

The present invention provides protection and deterrence against a detected DoS attack. The present invention may utilize one or all of the provisions to combat the attack. Specifically, the deterrence component of the present invention may or may not be implemented with the present invention.

The present invention may of course, be carried out in other specific ways than those herein set forth without departing from the essential characteristics of the invention. The present embodiments are, therefore, to be considered in all respects as illustrative and not restrictive and all changes coming within the meaning and equivalency range of the appended claims are intended to be embraced therein.

The invention claimed is:

1. A method performed in an access router for protecting a telecommunication network against a flooding attack from a multihomed network node, the access router providing communications between the multihomed network node and a network node working as a correspondent node (CN) for the multihomed network node, the method comprising the steps, each of which is performed by the access router, of:
   transferring data between the multihomed network node and the CN;
   determining whether the multihomed network node remains reachable a predetermined time after data transfer between the CN and the multihomed network node begins;
   if the multihomed network node remains reachable, continuing to transfer data between the CN and the multihomed network node; and
   upon determining that the multihomed network node is no longer reachable, instructing the CN to flush cached information comprising care-of addresses associated with the multihomed network node,
   wherein the multihomed network node is a mobile multihomed network node (MMN) having a plurality of IP addresses.

2. The method of protecting a telecommunication system as recited in claim 1, wherein the attack is controlled by a mobile and multihomed network attacker (MMA) that is the user of the MMN, or the attack is controlled by an entity that has planted functionality in the MMN or otherwise is in control of the MMN.

3. The method of protecting a telecommunication system as recited in claim 2, wherein the step of determining whether the multihomed network node remains reachable includes conducting an IP neighbor reachability detection procedure between the access router and the MMN.

4. The method of protecting a telecommunication system as recited in claim 2, wherein the access router waits a specified time period after data transfer begins to determine if the MMN is reachable prior to sending a binding flush request message to the CN instructing the CN to flush cached address information associated with the MMN.

5. The method of protecting a telecommunication system as recited in claim 4, further comprising the steps of:
   authenticating the binding flush request message by the CN; and
   if authenticated by the CN as a valid message, flushing the cached information associated with the MMN from the CN.

6. The method of protecting a telecommunication system as recited in claim 4, further comprising the step of sending a binding flush acknowledgement message from the CN to the access router to acknowledge flushing of the cached information in the CN.

7. The method of protecting a telecommunication system as recited in claim 6, further comprising the step of authenticating the binding flush acknowledgment message by the access router.

8. The method of protecting a telecommunication system as recited in claim 1, wherein the step of instructing the CN to flush the cached information includes instructing the CN to flush binding cache entries of the CN.

9. The method of protecting a telecommunication system as recited in claim 8, wherein care-of addresses associated with the MMN are flushed from the binding cache entries of the CN.

10. The method of protecting a telecommunication system as recited in claim 1, further comprising alerting the MMN about denial of service protection within the telecommunication system.

11. The method of protecting a telecommunication system as recited in claim 10, wherein the step of alerting the MMN about the denial of service protection includes adding an extension to an OptiSEND protocol message or a SEND protocol message to alert the MMN.

12. A system comprising:
   a multihomed network node;
   a correspondent node; and
   an access router for protecting a telecommunication network against a flooding attack from a multihomed network node, wherein the access router:
      provides communications between the multihomed network node and a network node working as a correspondent node (CN) for the multihomed network node, transfer data between the multihomed network node and the CN;
      determines whether the multihomed network node remains reachable a predetermined time after data transfer between the CN and the multihomed network node begins, and
      responsive to a determination that the multihomed network node is no longer reachable, sends a message to the CN instructing the CN to flush cached information comprising care-of addresses associated with the multihomed network node,
   wherein the multihomed network node is a mobile multihomed network node (MMN) having a plurality of IP addresses.

13. The system as recited in claim 12 wherein the attack is controlled by a mobile and multihomed network attacker (MMA) that is the user of the MMN or an entity which has planted functionality in the MMN or otherwise is in control of the MMN.

14. The system as recited in claim 13 wherein the sends a binding flush request to instruct the CN to flush any address associated with the MMN.

15. The system as recited in claim 13 wherein informs the MMN about denial of service protection within the communication network.

16. The system as recited in claim 15 wherein adds an extension to an OptiSEND protocol message or a SEND protocol message to alert the MMN.

* * * * *